United States Patent [19]
Karl

[11] 3,956,742
[45] May 11, 1976

[54] MOORING LOAD SENSOR

[75] Inventor: Robert D. Karl, Pacific Palisades, Calif.

[73] Assignee: Imodco, Inc., Los Angeles, Calif.

[22] Filed: Jan. 30, 1975

[21] Appl. No.: 545,420

[52] U.S. Cl. .............................. 340/224; 340/29; 340/267 C; 73/143
[51] Int. Cl.² ........................................ G08B 21/00
[58] Field of Search .......... 340/29, 224, 267 C, 340/272, 416, 421; 244/115, 116; 114/213, 215, 217, 230; 73/143, 144

[56] References Cited
UNITED STATES PATENTS

| | | | |
|---|---|---|---|
| 3,759,094 | 9/1973 | Al ........................................ | 73/143 |
| 3,823,395 | 7/1974 | Rigney et al. ................... | 340/267 C |

Primary Examiner—Alvin H. Waring
Attorney, Agent, or Firm—Lindenberg, Freilich, Wasserman, Rosen & Fernandez

[57] ABSTRACT

An offshore mooring terminal or buoy is provided with apparatus for indicating to a ship moored thereto that the stresses on the mooring equipment of the buoy reached a dangerous level and the ship should cast off in order to avoid serious damage to the buoy, possibly to the ship and also to avoid a possible cargo spill.

5 Claims, 4 Drawing Figures

MOORING LOAD SENSOR

BACKGROUND OF THE INVENTION

This invention relates to offshore mooring and loading terminals and more particularily to a method and means for indicating to a ship that the load on the mooring facility on the buoy may be reaching or has reached a level at which it is advisable that the ship should cast off in order to avoid serious damage to the mooring equipment.

Offshore loading and unloading facilities such as single buoy offshore terminals are available for transferring fluid cargoes and supplies between ships, particularly large tankers and other sea-going vessels, to onshore storage facilities. These offshore terminals are becoming more and more numerous as the draft required for ships, particularly large tankers, becomes greater than the depth of many of the harbors on which these ships call. Also, these offshore loading terminals provide a large measure of safety since, ships with dangerous cargoes are permitted by means of these offshore loading terminals, to anchor sufficiently far enough offshore so that they will not constitute a danger or menace to a harbor.

One of the recent, more popular, offshore loading terminals is the kind that has a swivel assembly that permits ships that are moored thereto to swivel or weathervane freely about the buoy in response to changes of tide and weather during transfer operations. However, whether or not the buoy is of the type which permits the ship to weathervane, one of the problems that can arise is that while a ship is moored to one of these buoys, the weather or tide, in certain areas, such as the North Sea, can change to such an extent that it is unsafe for the ship to remain moored to that buoy. This occurs because of the fact that the stresses which are created on the mooring equipment are such that it will give way, damaging the mooring equipment and possibly rupturing the hoses which extend between the ship and the buoy for the purpose of transferring fluid cargo there between. Therefore, it becomes desirable to determine when it is necessary for a ship to cast loose from a buoy in order to avoid these disasterous consequences. Obviously, it is not desirable to have the ship cast off too soon, since that requires termination of the loading or unloading process, and the ship would have to stand by until it was safe to again moor to the offshore floating terminal. This constitutes time during which a ship is not being used as a result of which there is a substantial loss to the owners.

SUMMARY OF THE INVENTION

An object of this invention is to provide a novel method and means for indicating to a ship which is moored to an offshore loading terminal how long it is safe to remain moored thereto.

Another object of this invention is the provision of a method and means for indicating to a ship moored to an offshore mooring terminal the stresses and strains which are being applied to the mooring equipment of the terminal, from which the stresses and strains being applied to the ship's mooring facilities may be deduced.

Still another object of this invention is the provision of a novel and useful method and means for indicating to a ship, while moored to an offshore loading terminal, that such mooring is safe.

The foregoing and other objects of this invention may be achieved by applying a strain gauge or gauges to the mooring arm of an offshore terminal. The strain gauge provides an electrical signal output indicative of the extent of the strain being applied to the mooring arm. This signal may be compared with one or more previously calibrated signals which have levels representative of the fact that the strain on the mooring facilities is approaching a value at which it will no longer be able to withstand the stresses and strains being applied to by the ship which is moored thereto.

The result of the comparison with these calibrated signals is to provide warning signals which may be applied to a transmitter for transmission to the ship on a specially allocated frequency. The warning signal may also be applied to trigger a flashing light on the buoy and, if desired to trigger an audio warning device. The warning devices may also be on the ship. The ship in response to any of these is alerted to be ready to cast off, and if the signals so indicate, to promptly cast off from the buoy.

If desired, the signal generated by the strain gauge located on the mooring arm of the buoy may be directly transmitted to the ship for comparison on the ship with a reference signal which is established at a level at which its mooring equipment would be damaged if that level is exceeded. Then, the audio warning device and light warning device may be on the ship as well as on the buoy.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
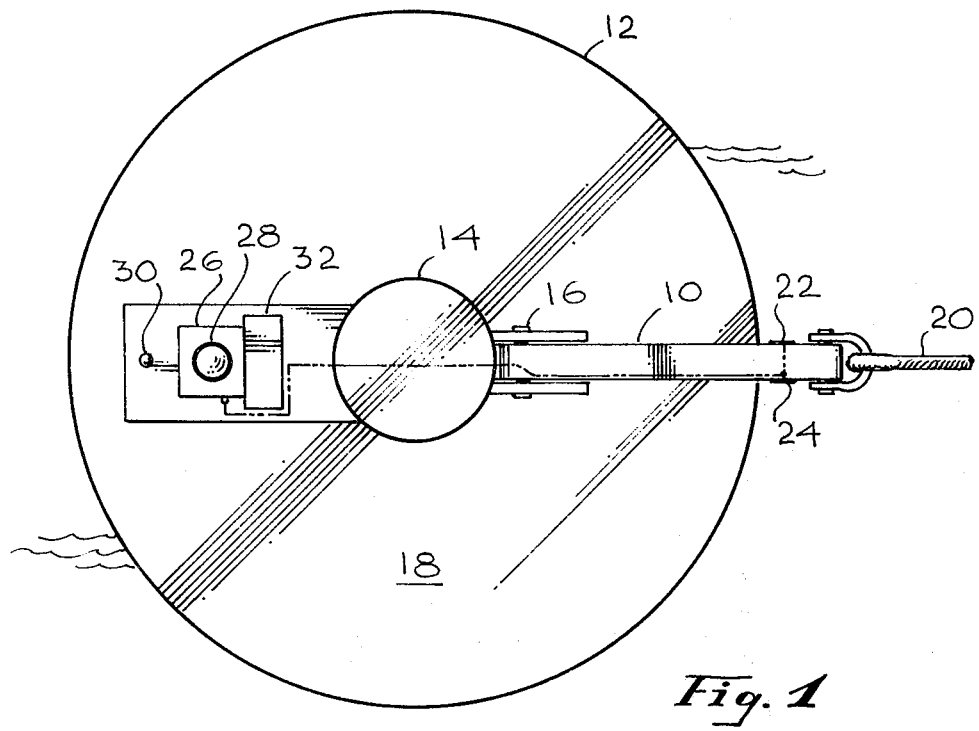
FIG. 1 is a plan and schematic view of the top of a single buoy offshore loading terminal illustrating an arrangement of the equipment required in accordance with this invention.
Figure 2:
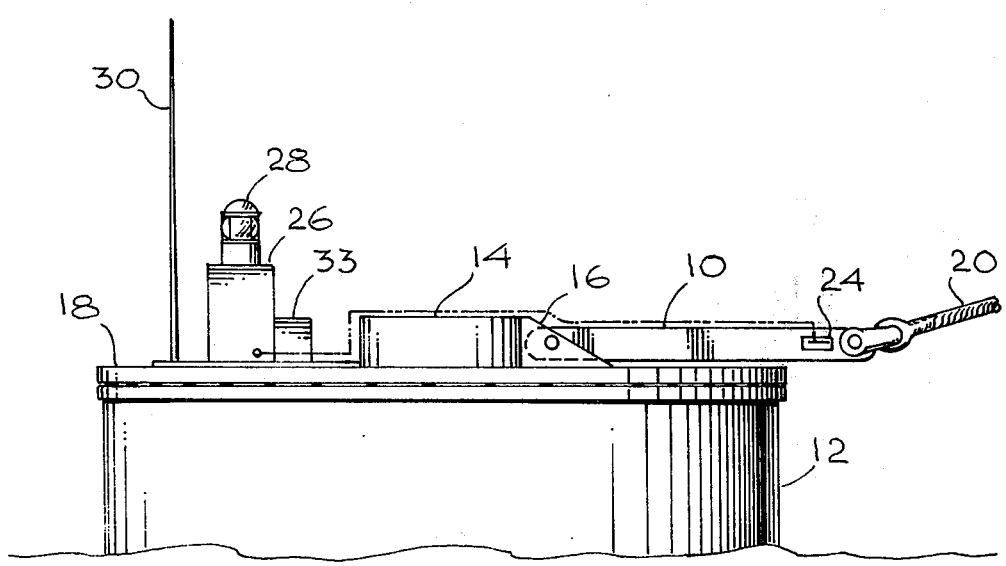
FIG. 2 is a side and schematic view of the equipment required on a single offshore loading terminal in accordance with this invention.

A single point mooring buoy is anchored offshore in deep water and has some type of mooring facility to enable a ship to be moored thereto while loading or unloading its liquid cargo. By way of illustration, FIG. 1 and 2 are respective plan and side views of the single point mooring buoy in which the usual facilities for coupling the hoses from the ship to the buoy for fluid transfer therebetween, have been omitted for the sake of clarity in the drawings. What is shown is an illustrative buoy mooring facility which permits a ship to weathervane there around, with changes in wind and tide. This is shown by way of illustration, and not to constitute a limitation upon the invention, since those skilled in the art, from teaching herein, will also know how to apply these teachings to a single point mooring buoy which does not permit weathervaning of a ship as well as how to apply the teachings of this invention to other types of mooring facilities without departing from the spirit and scope of this invention, as recited in the claims of this application.

Regarding FIG. 1 and 2, a mooring arm 10 is positioned on the top of the buoy 12 and is coupled to a central anchoring post by means of a trunnion coupling 16, which enables the mooring arm to pivot vertically. The central post is fixedly attached to a platform 18 which is rotatably mounted on the main body of the buoy 12. A hawser 20, from a ship, (not shown) may be attached to the mooring arm by any suitable arrangement, known to those skilled in the art.

In accordance with this invention, strain gauges 22, 24, are attached in well known manner to either side of the mooring arm 10, so that, as the mooring arm elongates, in response to the pull of the ship thereon, the strain gauges will provide electrical signals indicative of the strains on the mooring arm. These signals are amplified and compared with one or more reference level signals to determined whether they equal or exceed that level in which event suitable alarm equipment is activated, in a manner to be described subsequently here.

A housing 26 will contain the equipment required for transmitting either warning signals or a strain gauge signals, as desired, to a ship which is moored to the buoy. The housing may also contain equipment for actuating a visual alarm signal 28, and an audio alarm signal (not shown). The antenna 30 for the transmitter may be supported from the top of the rotating platform 18. The housing 32 which contains the power supply for the equipment may also be positioned on the rotating platform 18.

Figure 3:
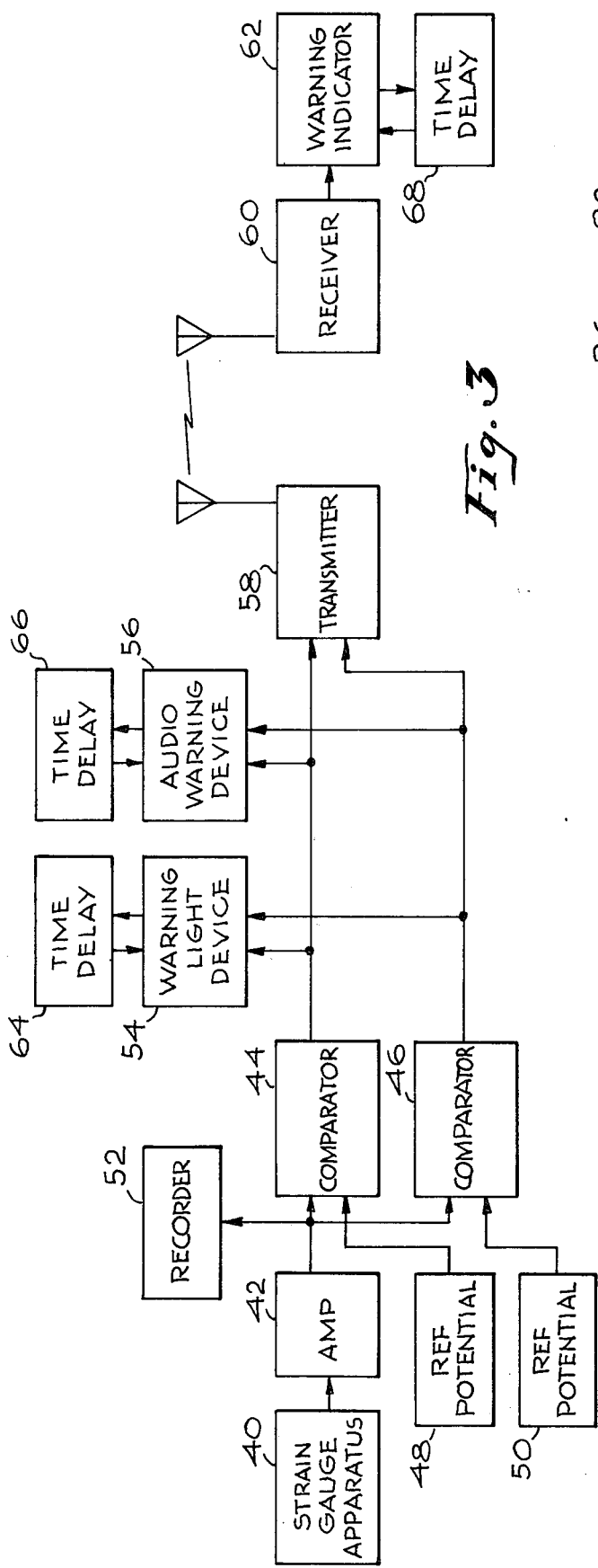
FIG. 3 is a block schematic diagram of the apparatus required for one embodiment of this invention.

FIG. 3 is a block schematic diagram of an arrangement, in accordance with one embodiment of this invention. Strain gauge apparatus 40, which includes the strain gauges and the associated circuits required for generating a signal representative of a strain applied to the mooring arm, has its output connected to an amplifier 42. The amplifier output is connected to two comparator 44, 46, which respectively compare the strain guage signal amplitude with the amplitude of reference potential sources respectively 48, 50. The comparator may be a differential amplifier, for example. The amplitude of a reference potential 48 may be set at a value which has been determined by previous tests on similar mooring arms, being stressed by ship hawsers, that the hawser, which is the weakest part of the mooring equipment is nearing the breaking point. In this event the ship's crew should be warned to standby for cast off. The amplitude of the reference potential 50 should be set at the previously determined value indicative of the fact that the ship had better cast off to avoid breaking the hawser.

If desired, a recorder may also be placed within the housing 26, on the buoy, for maintaining a record of the strains to which the mooring arm and the associated equipment is exposed.

The output of the comparator 44, when the strain gauge signal exceeds the reference potential signal from source 48, may be used to activate a warning, a flashing or amber light 54, and/or a audio warning signal device 56. Also, the comparator output is applied to a transmitter 58, whose function it is to modulate that signal and transmit it on an assigned frequency to a reciver 60 on board the ship. The ship receiver is connected to a warning indicator 62 which may take the form of a light or an audio signal, or both to let the ship's crew know that the strain being applied by their ship to the mooring equipment on the buoy is approaching a level at which they should standby to be ready for cast off.

Comparator 46 also applies an output signal to the warning light device 54, the audio warning device 56 and the transmitter 58. This signal causes these devices as well as the one on shipboard to provide indication in response to which the crew should promptly cast off from the buoy. Thus the warning light device can be similar to a traffic light which shows amber in response to the signal from comparator 44 and red in response to the signal from comparator 46. The audio warning device may give off short blast signals in response to a signal from comparator 44 and a steady state signal in response to a signal from comparator 46. The three warning devices may be equipped with time delay devices, respectively 64,66 and 68 so that once they are triggered they will stay on for a predetermined period to let the ship's crew know that a dangerous strain level has been reached, even if it happens to be a transient level.

Figure 4:
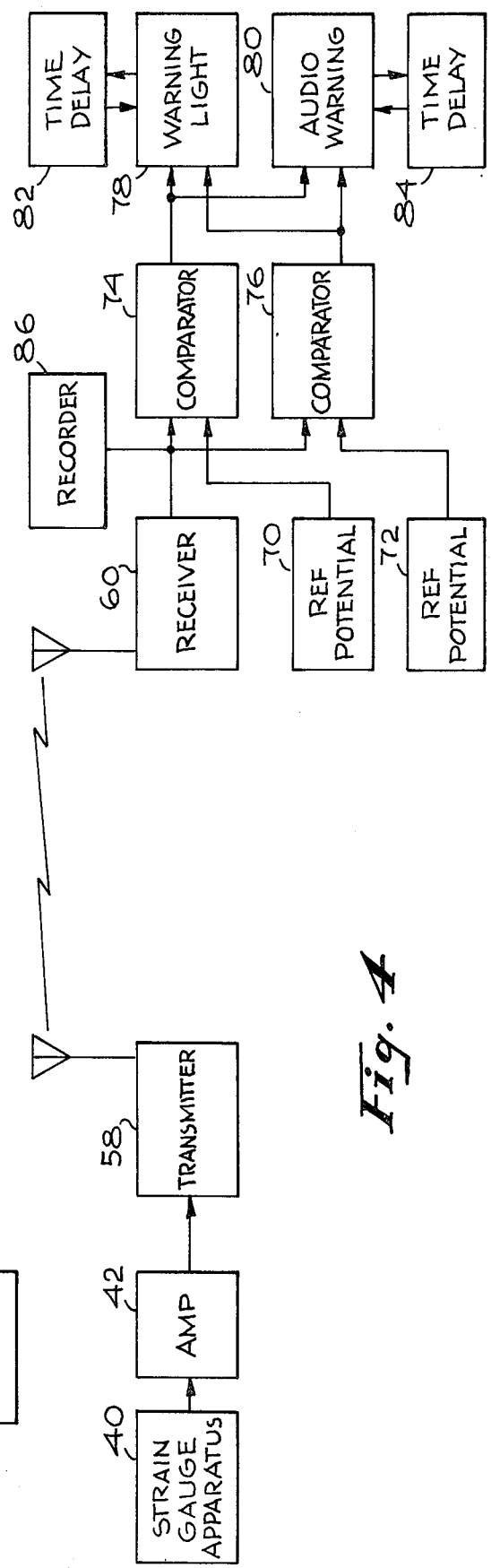
FIG. 4 is a block schematic diagram of the apparatus required in accordance with another embodiment of this invention.

FIG. 4 represents another embodiment of this invention. It may be desirable to establish a reference level signal on shipboard instead of on the buoy. In this event, the strain gauge signal which is the output of the amplifier 42 is applied directly to the transmitter 58. The transmitter transmits the strain gauge signal to the shipboard receiver 60. On shipboard, first and second reference potential sources 70 and 72 have their levels respectively established at values at which it is desired that the ship should first stand by and then cast off. The reference potentials and the output of the receiver, which is strain gauge signal, is applied to comparators 74 and 76. When the strain gauge signal exceeds the value of the reference potential 70, then a "standby" warning light and/or a standby audio warning are respectively provided by the warning light device 78 and the audio warning device 80. Each of these are equipped with the respective time delay devices 82 and 84 so that they are maintained on for a short duration after first receiving a signal. If it is desired to also record the strain gauge signal then the output of the receiver be applied to a recorder 86.

It may be desirable to have a receiver and warning equipment on shore as well as on a ship. In that event the shore installation may contain the receiver and associated equipment shown in either FIG. 3 or FIG. 4.

From the foregoing description it will be seen that there has been described and shown herein a novel, an and useful arrangement for detecting when strains on the mooring system fro a ship approaches a dangerous level and for warning the ship when to cast off to avoid dangerous consequences.

The embodiments of the invention, for which an exclusive property or privilege is claimed are defined as follows:

1. In a mooring arrangement for a ship of the type wherein a mooring means has a mooring arm to which a ship ties up to be moored, the improvement comprising strain guage means on said mooring arm surface for generating an output signal indicative of the strain being applied to said mooring arm, means for establishing a reference level signal representing the value of a strain which should be brought to the ship's attention, means for comparing said strain gauge output signal and said reference level signal for generating a warning signal when said strain guage signal equals or exceeds the said reference level signal, and means responsive to said warning signal for indicating to said ship the occurrence of said warning signal including means on said mooring means activated in response to said warning signal for producing an audio and visual indication of the occurrence of said warning signal for a predetermined interval.

2. In a mooring arrangement for a ship of the type wherein a mooring means has a mooring arm to which a ship ties up to be moored, the improvement comprising, strain gauge means on said mooring arm surface for generating an output signal indicative of the strain being applied to said mooring arm, means for establishing a first reference level signal representing the value of a strain at which the ship's crew should be prepared to cast off, first means for comparing said strain gauge output signal with said first reference signal and producing a first warning signal when said strain gauge output signal equals or exceeds said first reference level signal, means for establishing a second reference level signal representing the value of a strain at which the ship's crew should cast off, second means for comparing said strain gauge output signal with said second reference signal and producing a second warning signal when said strain gauge output signal equals or exceeds said second reference level signal, and means responsive to said first and second warning signals for providing indications thereof to said ship.

3. In a system as recited in claim 2, wherein said means responsive to said first and second warning signals for providing indications thereof to said ship include warning light means and audio signal means on said buoy for providing distinctive light and sound warning signals in response to said first and second warning signals.

4. In a system as recited in claim 2, wherein said means responsive to said first and second warning signals for providing indications thereof to said ship includes a transmitter on said mooring means for transmitting said first and second warning signals to said ship, a receiver on said ship for receiving said warning signals, and audio and visual signal producing means responsive to said first and second warning signals for producing separate audio and visual indications thereof.

5. In a mooring arrangement for a ship as recited in claim 1 wherein there is included a transmitter on said mooring means for transmitting said warning signal to said ship, a receiver on said ship for receiving said warning signal, and audio and visual means on said ship responsive to the warning signal output of said receiver for producing an audio and visual indication of said warning signal.

* * * * *